United States Patent Office 3,129,920
Patented Apr. 21, 1964

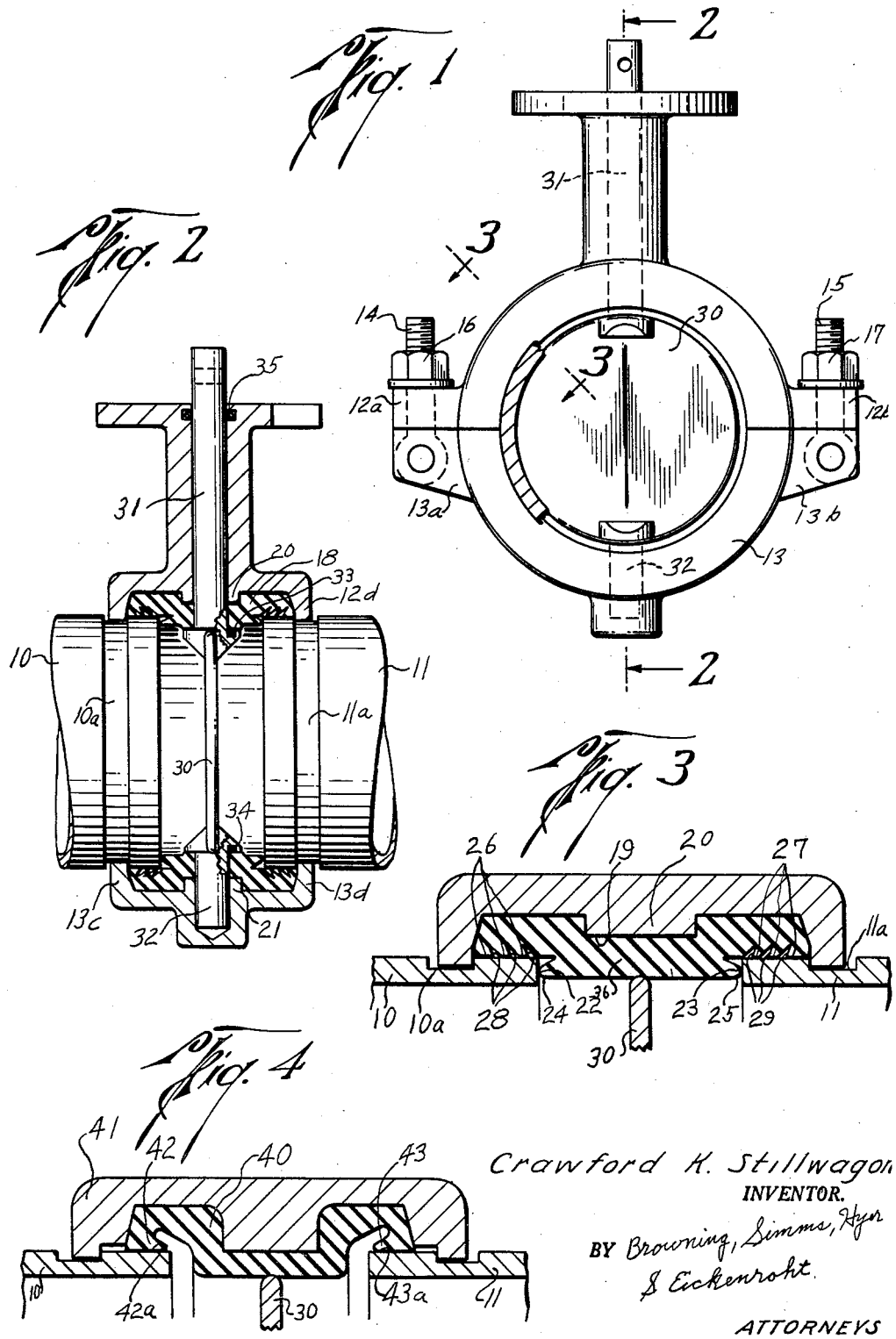

3,129,920
CONDUIT CONNECTION AND VALVE
Crawford K. Stillwagon, 5325 Kirby Drive,
Houston, Tex.
Filed July 31, 1961, Ser. No. 127,996
6 Claims. (Cl. 251—148)

This invention relates to improvements in conduit connections and refers more particularly to such connections having a disc or butterfly type valve as a part thereof.

A problem of expense, which is usually associated with valves and conduit connections, is the necessity for special fittings or connections for securing a valve in a pipeline. It is the principal object of this invention to provide an arrangement in which the valve itself with the pipe end to which it is to be secured may serve as the connection so that the pipe ends themselves provide the fittings for securing the valve in a line.

Another object is to provide a combination valve and coupling arrangement which is very simple in construction and may be easily and quickly secured in the pipeline.

Another object is to provide a combination valve and coupling arrangement in which a single seal element is operable to seal between the valve body parts and pipe ends and provides the seal seat for the valve disc.

Another object is to provide a combination valve and pipe coupling in which the seal element is pressure energized and employs interference type seals to accommodate sloppy tolerances, particularly in reference to the required modification of the pipe ends to receive the valve and coupling.

Another object is to provide a combination valve and pipe coupling in which the seal between the valve and pipe ends is provided at the edge of the pipes whereby conduit fluids are prevented from having access to the interior of the valve body.

Other and further objects of the invention will appear from the specification and drawings.

In general, the invention comprises separable body parts having means for engaging grooves or shoulders on the pipe ends to secure the pipe ends within the body parts. A resilient seal means is provided between the body and the pipe ends when the body parts are secured in place about the pipe ends. A valve member of the butterfly or disc valve type controls flow through the device and engages resilient seal means within the body parts to provide a tight seal. Means may be provided to prevent movement of the material of the resilient seal under the influence of pressure and also under the influence of the drag of the valve disc during opening and closing operations.

According to one aspect of the invention, it is preferred that the resilient seal means be of the pressure-energized interference type, for this facilitates assembly of the combination and accommodates sloppy tolerances particularly with reference to preparation of the pipe ends for inclusion in the unit. For many services, it is preferred to utilize the interference seal between the edges of the pipe ends so as to prevent the line fluid from having access to the interior of the pipe body.

In the drawings, wherein two embodiments of the invention are shown for purposes of illustration:

FIG. 1 is an end view illustrating the preferred embodiment of the invention with a fragment only of the pipe shown in cross section;

FIG. 2 is a view along a vertical plane passing through the axis of the valve shown in FIG. 1 and showing the combination of the invention whereby two pipe ends are joined together;

FIG. 3 is a view taken along the line 3—3 in FIG. 1 on an enlarged scale; and

FIG. 4 is a view showing a modified form of seal element, constituting another embodiment of the invention, and taken upon a line corresponding with position 3—3 shown in FIG. 1.

In the drawings, reference numerals 10 and 11 designate confronting pipe ends of a pipeline to be joined together in accordance with this invention. A means is provided on the pipe ends for securing a valve against longitudinal movement along the pipe ends. This may be accomplished by the grooves 10a and 11a formed adjacent the ends of the pipe by either grooving the exterior of the pipe or by securing, as by welding, a ring on the pipe end.

The combination coupling and valve, as seen in FIG. 1 comprises a plurality of body parts, illustrated at 12 and 13. Means for securing the body parts in place to form a ring-like configuration and to secure same on the pipe ends 10 and 11 include the wings 12a and 12b and 13a and 13b formed on the body parts, respectively, eye bolts 14 and 15 pivoted to wings 13a and 13b, and nuts 16 and 17.

Each of the body parts have inturned flanges 12c, 12d and 13c, 13d, formed respectively at their edges. These flanges fit in the grooves 10a and 11a and, with the body parts made up, provide the coupling for securing the pipe ends together.

To seal the joint, a resilient sealing means is employed within the trough provided by the inturned flanges and is brought into engagement when the body parts are brought together by the eye bolts and nuts. While external energization can be utilized to provide means to seal between the body parts and the pipe ends, it is preferred to use pressure energized seals of the interference type for this purpose. The flexible sealing parts of this type of seal provide the initial interference required for a seal over a wide range of tolerances which is especially of concern in connection with the pipe ends. The pipe ends themselves are often fabricated within rather sloppy nominal dimensions, and it is preferable from the cost standpoint that the means for securing the pipe to the body parts, as for example the grooves 10a and 11a, may be placed on the pipe ends within rather sloppy tolerances. The interference type seal makes this possible without materially increasing the difficulty of securing the seal means over the pipe ends and within the body parts during the makeup of the unit.

The sealing means may take the form of the resilient sleeve 18 and fits within the trough formed by the body parts. A recess 19 in the sleeve and mating seat 20 and 21 in the body parts more or less anchor the material of the sleeve against excessive movement under the influence of pressure differentials developing across the closed valve or due to the drag of the valve on the material in opening and closing operations.

The parts or lips that provide the pressure-energized seal are shown more clearly in FIG. 3. The parts for sealing with the edges of the pipe ends are the lips or ridges having the sealing surfaces 22 and 23 facing or disposed generally toward the ends of the sleeve and adapted to engage the end edges of the pipe 10 and 11. As is common with this type of seal, in the relaxed position of the rubber-like material, seal surfaces 22 and 23 project slightly outwardly into the space occupied by the pipe ends in the drawings. This provides the interference fit over a rather wide range of tolerances for the placement of the grooves 10a and 11a. The parts or lips have surfaces 24 and 25 that are laterally extending from the surfaces 22 and 23 and are exposed to the fluid within the sleeve so that, as the pressure of the fluid increases, the surfaces 22 and 23 are pressed into tighter and tighter engagement with the pipe edges. Surfaces 24 and 25 are disposed generally toward the axis of the sleeve.

Similar pressure-energized interference type seal parts are provided at the ends of the sleeve for engaging the outer surfaces of the pipe ends. These parts have the sealing surfaces 26 and 27 disposed generally toward the exterior of the pipe ends and the lateral surfaces 28 and 29, respectively, disposed generally inwardly toward the center of the sleeve. These parts also have the relaxed dimension in which the sealing surfaces 26 and 27 are somewhat closer to the axis of the sleeve. If pressure should leak by the sealing surfaces 22 or 23, these parts will be actuated to provide a seal preventing leakage externally of the connection.

The valve disc 30 has stems 31 and 32 extending through openings in the sleeve and the stems are journaled in the body parts. The fit of the stems 31 and 32 through the openings may provide a seal about these stems or additional seal means, such as the O-rings 33 and 34, may be employed to seal between the valve stems and the sleeve. It is preferable that the material of the O-rings 33 and 34 be either somewhat softer or somewhat harder than that of the sleeve 18. An additional O-ring 35 may be employed to seal about the stem 31.

The valve disc 30 engages the seat 36 formed interiorly of the sleeve 18, upon which the seal surfaces 22 and 23 are formed. There is interference between the valve disc and seat 36 when the valve disc is in closed position, as illustrated in the drawings.

It is believed that the operation of the invention is apparent from the foregoing description. The unit is assembled by securing the disc 30, sleeve 18, and upper body part 12 in at least nearly their proper relative positions and then inserting the pipe ends 10 and 11 within the sleeve ends. To facilitate this, the stem and valve may be somewhat depressed so that the open ends of the sleeve are available for insertion of the pipe ends. The curved edges of the sleeve facilitate insertion of the pipe ends within the sleeve. Upper body part 12 is then pushed down over the valve stem 31 until the flanges 12c and 12d mate with the grooves 10a and 11a. The bottom body part 13 is then moved into position about the sleeve 40 so that its flanges 13c and 13d also engage the groove 10a and 11a. Nuts 16 and 17 are then tightened until the makeup of the body parts and the resilient seal is effected. With this arrangement, the space between the ends of the pipes is spanned by the body parts and resilient seal and the valve 30 may be operated in conventional manner by a hand wrench secured to the upper end of stem 31.

In the alternate form or embodiment shown in FIG. 4, a modified form of sleeve 40 is shown. The body part 41 is illustrated with a somewhat different inner configuration to illustrate one variation to which the invention is subject. Seal 40 has the parts 42, 43 and these lips have an interference fit with the pipe ends 10 and 11 provided by their sealing surfaces 42a and 43a. These latter surfaces are generally disposed toward the pipe ends and are connected to the lateral surfaces which are exposed to the pressure fluid within the valve. The central portion of the sleeve 40 serves as the seat for the valve disc 30.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A butterfly valve adapted for direct connection between two aligned pipes having grooves in their outer surfaces adjacent their confronting ends, comprising separable body parts, each body part being formed with inturned flanges at their edges providing a trough therebetween and adapted to fit grooves in the pipe ends for assembly in a pipeline; a sleeve of resilient sealing material within the trough; parts formed on the inner central part of the sleeve for engaging the pipe end edges with an interference fit providing a pressure-energized type seal therewith, said sleeve having parts formed on the inner surface adjacent each end providing an interference fit with the outer surface of pipe ends providing a pressure-energized seal therewith; means for assembling and holding the body parts in a circular configuration with the sleeve in the trough provided by the body parts; and a valve disc with stems extending through the sleeve and journaled in the body parts, said disc engaging the sleeve to provide a seal therewith when in closed position.

2. As a subcombination, a seal sleeve adapted for use in conjunction with body parts to provide a valve for coupling two pipe ends together comprising a sleeve of resilient sealing material, said sleeve having annular sealing parts of the pressure-energized type formed on its inner surface adjacent each end with their sealing surfaces disposed generally inwardly and said parts having lateral surfaces disposed generally toward the center of the sleeve, and additional sealing parts of the pressure-energized interference type formed internally of the sleeve with their sealing surfaces disposed generally toward the ends of the sleeve and having surfaces laterally of the sealing surfaces exposed to the interior of the sleeve.

3. As a subcombination, a seal sleeve adapted for use in conjunction with body parts to provide a valve for coupling two pipe ends together comprising a sleeve of resilient sealing material; an inturned seat for a valve disc formed on the interior of the sleeve at about its mid-point of reduced diameter relative to the inner diameter of the remainder of the sleeve; an annular recess formed in the outer surface of the sleeve radially outwardly of the seat, said sleeve having annular sealing parts of the pressure-energized type formed on its inner surface adjacent each end with their sealing surfaces disposed generally inwardly and said parts having lateral surfaces disposed generally toward the center of the sleeve; and additional annular sealing parts of the pressure-energized interference type formed on the seat edges with their sealing surfaces disposed generally toward the ends of the sleeve and having surfaces laterally of the sealing surfaces exposed to the interior of the sleeve.

4. A butterfly valve adapted for direct connection between two aligned pipes having grooves in their outer surfaces adjacent their confronting ends, comprising separable body parts, each body part being formed with internal flanges at their edges providing a trough therebetween and adapted to fit grooves in pipe ends for assembly in a pipeline, each body part being further provided with an in-turned seat located between the flanges, the seat being of reduced diameter relative to the immediate adjacent portions of the body part to provide an annular seat with the body parts assembled; a resilient sealing means adapted to fit within the body trough provided by the body parts and equipped with pressure energized interference type seal parts for sealing against pipe ends when connected thereto, said seal means further having a recess on its outer surface to receive the annular seat on the body parts; means for assembling and holding the body parts in a circular configuration with the sealing means in the trough provided by the body parts; and a valve disc mounted for rotation in the body parts between open and closed positions with the seal means engaging the valve disc when in closed position and sealing between it and the body parts; the valve disc being concentrically aligned with the annular seat when in closed position so that the annular seat will resist movement of the sleeve material under influence of a pressure differential across the closed valve disc and due to the drag of the valve disc against the sleeve in opening and closing operations of the valve.

5. In combination, two confronting aligned pipe ends, each having an annular groove surrounding it and lying adjacent the edge thereof; separable body parts surrounding the adjacent pipe ends, each body part having inturned flanges at their edges, said flanges fitting the grooves of the pipe ends to couple the pipe ends together, and forming an annular trough between the flanges; a sleeve of resilient sealing material within the trough; parts formed on the inner central part of the sleeve for engaging with an interference fit, the end edges of the pipe ends providing a pressure-energized type seal therewith, the sleeve having parts engaging the outer surface of the pipe ends with an interference fit to provide a pressure-energized type seal therewith; a valve disc with stems extending through the sleeve and journaled in the body parts, said disc engaging the sleeve to provide a seal therewith when in closed position; and means for releasably securing the body parts together as a ring with the flanges in the grooves whereby the body parts, sleeve and the valve disc serve as a coupling for the pipe ends and a means for controlling flow therethrough.

6. A butterfly valve adapted for direct connection between two aligned pipes having grooves in their outer surfaces adjacent their confronting ends, comprising separable body parts, each body part being formed with internal flanges at their edges providing a trough therebetween and adapted to fit grooves in pipe ends for assembly in a pipeline, each body part being further provided with an inwardly facing seat located between the flanges, the seat being of different diameter relative to the immediate adjacent portions of the body part to provide an annular seat with the body parts assembled; a resilient sealing means adapted to fit within the body trough provided by the body parts and equipped with pressure-energized interference type seal parts for sealing against pipe ends when connected thereto, said seal means further having a portion on its outer surface to interfit with the annular seat on the body parts; means for assembling and holding the body parts in a circular configuration with the sealing means in the trough provided by the body parts; and a valve disc mounted for rotation in the body parts between open and closed positions with the seal means engaging the valve disc when in closed position and sealing between it and the body parts; the valve disc being concentrically aligned with the annular seat when in closed position so that the annular seat will resist movement of the sleeve material under influence of a pressure differential across the closed valve disc and due to the drag of the valve disc against the sleeve in opening and closing operations of the valve.

References Cited in the file of this patent

UNITED STATES PATENTS

| | | |
|---|---|---|
| 1,887,332 | Shrum | Nov. 8, 1932 |
| 2,740,423 | Stillwagon | Apr. 3, 1956 |
| 2,923,524 | Fawkes | Feb. 2, 1960 |

FOREIGN PATENTS

| | | |
|---|---|---|
| 984 | Great Britain | Mar. 1, 1882 |
| 536,993 | Great Britain | June 4, 1941 |
| 1,130,544 | France | Oct. 1, 1956 |